(12) United States Patent
Cáliz et al.

(10) Patent No.: US 9,934,081 B2
(45) Date of Patent: *Apr. 3, 2018

(54) CONDITIONAL SAVING OF INPUT DATA

(71) Applicant: Microsoft Technology Licensing, LLC, Redmond, WA (US)

(72) Inventors: Christopher Cáliz, Seattle, WA (US); Brian Holley, Kirkland, WA (US); Greg Akselrod, Seattle, WA (US); Ryan James, Seattle, WA (US); Yan Zhen, Bellevue, WA (US); Gareth A. Jones, Issaquah, WA (US); Danny Amirault, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,702

(22) Filed: Dec. 13, 2016

(65) Prior Publication Data

US 2017/0091012 A1    Mar. 30, 2017

Related U.S. Application Data

(63) Continuation of application No. 14/338,301, filed on Jul. 22, 2014, now Pat. No. 9,672,114.

(60) Provisional application No. 61/980,443, filed on Apr. 16, 2014.

(51) Int. Cl.
*G06F 15/16* (2006.01)
*G06F 11/07* (2006.01)

(52) U.S. Cl.
CPC ...... *G06F 11/0709* (2013.01); *G06F 11/0751* (2013.01); *G06F 11/0793* (2013.01)

(58) Field of Classification Search
CPC ............ G06F 11/0709; G06F 11/0751; G06F 11/0793
USPC .................................................. 709/203, 224
See application file for complete search history.

(56) References Cited

U.S. PATENT DOCUMENTS

| 7,392,484 | B1 | 6/2008 | Garfinkel et al. |
| 7,519,573 | B2 | 4/2009 | Helfman et al. |
| 8,179,563 | B2 | 5/2012 | King et al. |
| 8,543,675 | B1 | 9/2013 | Yiu et al. |
| 8,645,383 | B2 | 2/2014 | Brown et al. |
| 9,672,114 | B2 * | 6/2017 | Caliz ................... G06F 11/1451 |
| 2003/0053084 | A1 | 3/2003 | Geidl et al. |

(Continued)

FOREIGN PATENT DOCUMENTS

| EP | 1699207 | 9/2006 |
| WO | WO 2008127474 | 10/2008 |
| WO | WO 2013102371 | 7/2013 |

OTHER PUBLICATIONS

"Capture and Embed PDF files with the OneNote API", Retrieved from <<https://msdn.microsoft.com/en-us/library/office/%20dn655137(v=office.15).aspx>>, Apr. 28, 2014, 7 Pages.

(Continued)

*Primary Examiner* — Philip B Tran

(57) ABSTRACT

This document relates to preserving input data. One example includes obtaining a request that a service perform processing on input data to produce an output representation of the input data. This example also includes applying criteria to the request, and preserving the input data responsive to determining that the criteria are met.

20 Claims, 12 Drawing Sheets

(56) References Cited

U.S. PATENT DOCUMENTS

| | | |
|---|---|---|
| 2006/0041589 A1 | 2/2006 | Helfman et al. |
| 2006/0184675 A1 | 8/2006 | Salmre |
| 2006/0274086 A1 | 12/2006 | Forstall et al. |
| 2008/0154990 A1 | 6/2008 | Jankowsky |
| 2008/0201452 A1 | 8/2008 | Athas et al. |
| 2009/0055727 A1 | 2/2009 | Hansen et al. |
| 2010/0145924 A1 | 6/2010 | Zabramski et al. |
| 2011/0179219 A1 | 7/2011 | Ma |
| 2011/0202827 A1 | 8/2011 | Freishtat |
| 2012/0062940 A1 | 3/2012 | Masutani |
| 2012/0084346 A1 | 4/2012 | Mickens |
| 2012/0204087 A1 | 8/2012 | Yamada |
| 2012/0213495 A1 | 8/2012 | Hafeneger |
| 2012/0330711 A1 | 12/2012 | Jain et al. |
| 2013/0110779 A1 | 5/2013 | Taylor |
| 2013/0159497 A1 | 6/2013 | Butler |
| 2013/0305039 A1 | 11/2013 | Gauda |
| 2015/0200883 A1 | 7/2015 | Brotherston |
| 2015/0261733 A1 | 9/2015 | Mikutel et al. |
| 2015/0301898 A1 | 10/2015 | Caliz et al. |

OTHER PUBLICATIONS

"Capture embedded files with the OneNote API" retrieved at: http://msdn.microsoft.com/en-us/library/office/dn575436%28v=office.15%29.aspx, Apr. 16, 2014, 2 pages.

"EverClip (Web Clipper)", Available at: https://play.google.com/store/apps/details?id=com.noinnion.android.everclip, Aug. 23, 2013, pages.

Barr, "Programmable Feedback Notification for the Simple Email Service", AWS Blog, Jun. 26, 2012, 7 pages, retrieved at: https://aws.amazon.com/blogs/aws/programmable-feedback-notification-for-the-simple-email-service/.

Caliz, Christopher, "PDF Rendering now in the OneNote API", Available at: http://blogs.msdn.com/b/onenotedev/archive/2014/04/29/pdf-rendering-now-available-in-the-onenote-api.aspx>>, Apr. 29, 2014, 2 pages.

Cesario, "Using Mining@Home for Distributed Ensemble Learning", Data Management in Cloud, Grid and P2P Systems, Berlin, Sep. 5, 2012,12 pages.

Dealing with Note Attachments, retrieved at http://dev.evernote.com/doc/articles/resources.php, Aug. 19, 2013, 1 page.

Deshpande, Handling Bounces and Complaints, Amazon SES Blog, Jun. 26, 2012, 10 pages, retrieved at: https://~ws.amazon.com/blogs/ses/handling-bounces-and-complaints/.

Nazarian, "How to use Scrapbook on the Samsung Galaxy Note 3", retrieved at http://www.talkandroid.com/guides/samsung-galaxy-note-3-guides/how-to-use-scrapbook-on-the-samsung-galaxy-note-3/, Oct. 28, 2013. 7 pages.

PCT International Search Report in PCT/US2015/020051, dated Jun. 30, 2015, 11 pages.

PCT International Search Report in PCT/US2015/024420, dated Jul. 7, 2015, 12 pages.

PCT Second Written Opinion in PCT/US2015/020051, dated Feb. 25, 2016, 7 pages.

PCT Second Written Opinion in PCT/US2015/024420, dated Mar. 11, 2016, 7 pages.

Sano, et al., "Web Block Extraction System Based on Client-Side Imaging for Clickable Image Map", In Journal of Communication and Computer, Jun. 30, 2013, pages.

Tim T., "Release: Amazon Simple Email Service on Jan. 24, 2011", Amazon Web Services, Jan. 24, 2011, 3 pages, retrieved at: https://aws.amazon.com/releasenotes/Amazon-SES/7408898684410738.

U.S. Appl. No. 14/216,514, Amendment and Response filed Nov. 17, 2016, 10 pgs.

U.S. Appl. No. 14/216,514, Amendment and Response filed Aug. 19, 2016, 13 pages.

U.S. Appl. No. 14/216,514, Office Action dated May 19, 2016, 21 pages.

U.S. Appl. No. 14/216,514, Office Action dated Sep. 20, 2016, 20 pages.

U.S. Appl. No. 14/338,301, Amendment after Allowance filed Nov. 28, 2016, 5 pgs.

U.S. Appl. No. 14/338,301, Amendment after Allowance filed Dec. 7, 2016, 6 pgs.

U.S. Appl. No. 14/338,301, Amendment and Response filed May 11, 2016, 9 pages.

U.S. Appl. No. 14/338,301, Notice of Allowance dated Jan. 31, 2017, 7 pgs.

U.S. Appl. No. 14/338,301, Notice of Allowance dated Oct. 28, 2016, 2 pgs.

U.S. Appl. No. 14/338,301, Notice of Allowance dated Aug. 26, 2016, 7 pages.

U.S. Appl. No. 14/338,301, Office Action dated Jan. 20, 2015, 10 pages.

U.S. Appl. No. 14/338,301, USPTO Response dated Dec. 15, 2016, 2 pgs.

U.S. Appl. No. 14/338,301, USPTO Response dated Dec. 27, 2016, 2 pgs.

U.S. Appl. No. 14/216,514, Office Action dated Jul. 25, 2017, 24 pages.

U.S. Appl. No. 14/216,514, Amendment and Response filed Sep. 13, 2017, 10 pages.

U.S. Appl. No. 14/216,514, Office Action dated Oct. 19, 2017, 16 pages.

* cited by examiner

CONDITIONAL SAVING OF INPUT DATA

RELATED APPLICATION

This application is a continuation of U.S. patent application Ser. No. 14/338,301 (now U.S. Pat. No. 9,672,114), filed Jul. 22, 2014, titled "CONDITIONAL SAVING OF INPUT DATA," which application is a utility application that claims priority from Provisional Application No. 61/980,443 (now expired), filed Apr. 16, 2014, which are hereby incorporated herein by reference in their entirety.

BACKGROUND

Some services perform relatively resource-intensive processing on behalf of a requesting entity, such as a user or a computing device. For example, graphical rendering, encryption, and signal processing are very different types of resource-intensive processing that can be performed by a service. Generally, a requesting entity can submit one or more inputs to a given service and receive one or more outputs from the service. For example, a client device may submit a request to a web service and subsequently receive a response from the web service. As another example, an application may request a local service to perform certain functionality on a given computing device. In most cases, the service will successfully complete and provide the expected response to the requesting entity. However, there may be circumstances where the service fails to provide the expected outputs to the requesting entity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to conditional saving of input data. One example includes a method or technique that can be performed by a computing device. The method or technique can include obtaining a request that a service perform processing on input data to produce an output representation of the input data. The method or technique can also include applying criteria to the request. If the criteria are met, the method or technique can preserve the input data.

Another example includes a cloud computing system that includes one or more hardware processing units and one or more computer-readable storage devices. The computer-readable storage devices can store computer-executable instructions which, when executed by the one or more hardware processing units, can cause the cloud computing system to receive a service request over a network. The service request can include input data. The computer-executable instructions can also cause the cloud computing system to determine that the service request indicates that the input data should not be persisted by the cloud service. The computer-executable instructions can also cause the cloud computing system to override the service request by persisting the input data responsive to detecting a failure.

Another example includes a method or technique that can be performed by a computing device. The method or technique can include obtaining a service request having input data and applying criteria to the service request by evaluating an output of the service request. The method or technique can also include preserving the input data of the service request responsive to detecting that the output of the service request satisfies the criteria.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
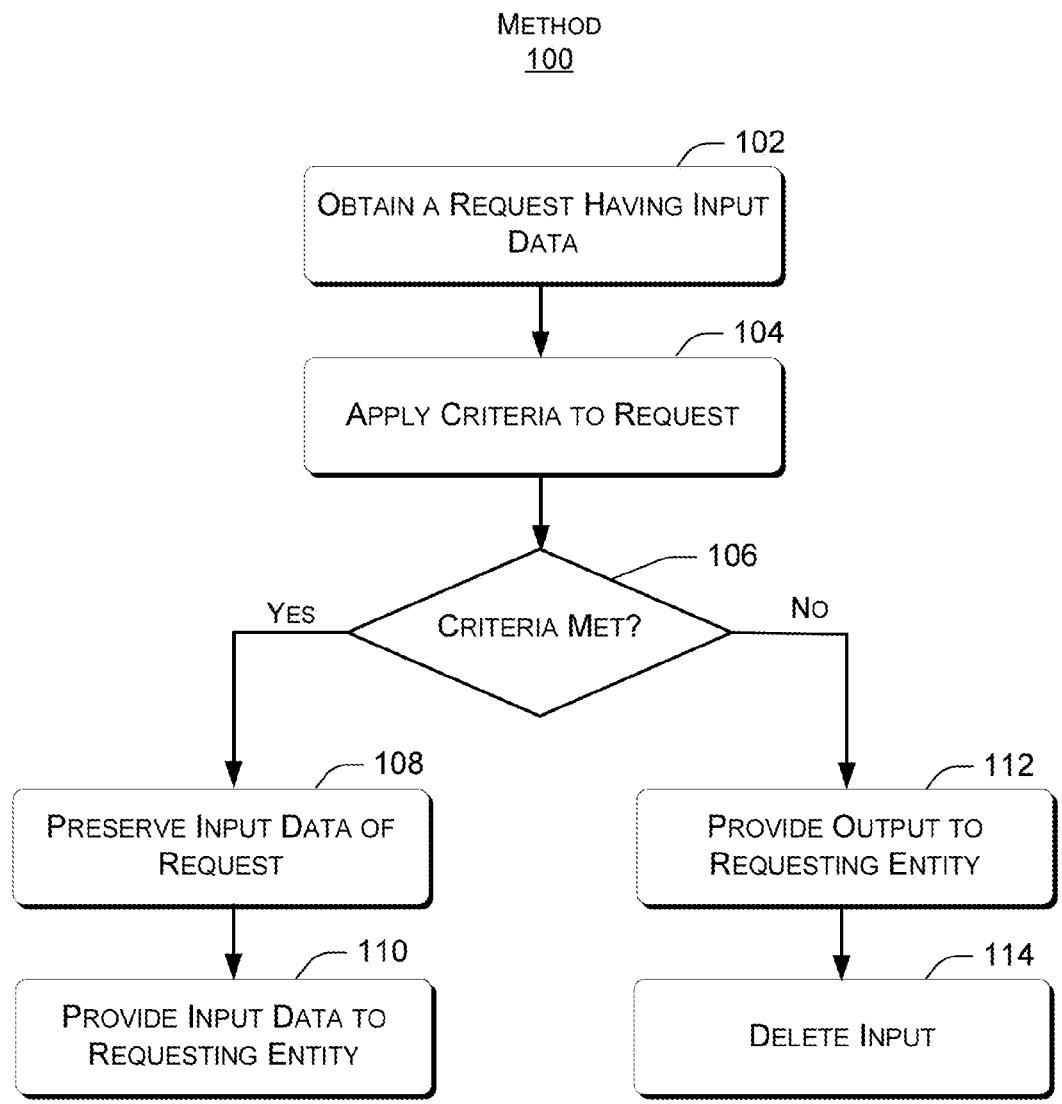
FIG. 1 illustrates an example method or technique consistent with some implementations of the present concepts.

In many different contexts where a requesting entity requests an output from a service, there may be times when the requesting entity does not receive the expected output. For example, the service may fail to process the input data correctly, or the service may decide for policy reasons not to provide the expected response. If the requesting entity has not taken steps to retain the input data, the input data may be lost. Some implementations may mitigate the impact of lost input data by conditionally saving the input data when certain criteria are met. For example, some implementations may, by default, delete input data after a processing task has completed but override this default behavior by preserving the input data for the requesting entity when the service detects a failure.

In some cases, the service may apply various failure criteria to determine whether or not to preserve the input data. For the purposes of this document, the term "failure criteria" includes any criteria indicating that the requesting entity will not receive expected outputs. In some cases, failure criteria can be indicative that requested processing has failed to complete properly, e.g., due to corrupted/malformed input data, crashes/errors by the processing task, etc. Other failure criteria may relate to policy decisions by the service, e.g., the service may decide not to provide the requesting entity with the requested outputs because a storage quota or processing time limit was exceeded irrespective of whether the processing task successfully completes.

In some implementations, the service may perform early detection of failure criteria, such as by evaluating input data and determining that the input data should be preserved before beginning the requested processing task. For example, the service may execute a preprocessing routine that can detect that input data is malformed and preserve the malformed input data for the requesting entity without initiating execution of the processing task. Generally, the input data can be preserved via many different mechanisms, including persisting the input data remotely from the requesting entity or embedding the input data in a file (such as a document) that is provided to the requesting entity.

Under some circumstances, it may be difficult to perform early detection of failures depending on the specific processing task being performed and the type of failure under consideration. For example, in some cases, the input data may not have any apparent deficiencies and the service will proceed with initiating the requested processing task. While the processing task is executing, the service may monitor the processing task to detect whether certain failure criteria are met. For example, consider a service that sets a time limit on the amount of time the processing task can take, e.g., one minute. A requesting entity may provide an input file to the service for processing. The processing task may take longer than the one minute time limit to complete and the service may decide to kill the task before the output is generated. Under these circumstances, it can also be useful to preserve the input file for the requesting entity because the requesting entity will not receive the expected output (e.g., the requesting entity may receive no output whatsoever, an error message, a partially complete output, etc.).

In some cases, the processing task may proceed to completion but the service may nevertheless determine that a failure has occurred. For example, the service may apply certain failure criteria to an output of the processing task and deem that the output is considered a failure case. Consider the case where a processing task produces outputs that are substantially larger than the input data, and the failure criteria include a policy limit on the size of the output, e.g., the output may have an overall memory footprint no larger than 100 megabytes. Assume the service receives a 5 kilobyte input file and successfully processes the input file into an output file of 500 megabytes. Under these circumstances, the output file has been produced correctly and is available to provide to the requesting entity. Nevertheless, the service can enforce the size limit by not providing the output file to the requesting entity. To prevent the requesting entity from losing the input data, the service can preserve the input data responsive to determining that the size limit failure criteria has been met.

Conditional Saving Method

The following discussion presents an overview of functionality that can conditionally preserve input data. The functionality can be performed by or on behalf of various types of services. The service can be embodied as a cloud service, a local application, a library routine, an operating system routine, and/or dedicated hardware circuitry, depending upon the specific implementation. Thus, the functionality can be implemented in software, hardware, or combinations thereof.

FIG. 1 illustrates an exemplary method 100 consistent with the present concepts. As discussed more below, the method can be implemented on many different types of devices, e.g., by one or more cloud servers, by a client device such as a laptop, tablet, or smartphone, or combinations thereof. Method 100 can be implemented by a service that executes locally on the same device as the requesting entity, by a service that executes remotely from the requesting entity, or on behalf of a local or remote service.

Method 100 begins at block 102, where a request is obtained from a requesting entity. For example, the request may have input data such as a document, digital samples of a signal, or a digital communication. The request may request that a processing task be performed on the input data, such as a rendering of the document, a transform applied to the digital samples, or encryption of the digital communication. In some cases, the request may be to obtain a different representation of the input data (e.g., rendering the input data into an image) or in other cases the request may be to retrieve other data (e.g., retrieving documents matching an input search query).

Method 100 continues at block 104, where criteria are applied to the request. For example, the criteria can be failure criteria that indicate situations where the requesting entity will not receive an expected output of the processing task. As discussed more below, failure criteria can be evaluated before the service initiates the processing task, after the service successfully completes the processing task and has obtained the output, or as the processing task is ongoing.

Method 100 continues to decision block 106, which determines whether the criteria are met. In cases where the criteria are met, the method continues to blocks 108 and 110.

When the criteria are met, block 108 can preserve the input data of the request. For example, the input data can be persisted on storage responsive to determining that the criteria have been met. In some cases, the input data is persisted in a designated storage location associated with the requesting entity (e.g., a user account in cloud storage).

Block 110 can provide the input data to the requesting entity. In some implementations, the requesting entity can automatically be sent the input data in lieu of the expected output. For example, the document can be provided to the requesting entity instead of the requested rendered image, the signal samples can be provided to the requesting entity instead of the requested transformed signal, and/or the communication can be provided to the requesting entity in unencrypted form instead of the requested encrypted communication. In other cases, the input data is not provided to the requesting entity until a further request is received. For example, the service can send the requesting entity a message indicating that the failure occurred and that the input data has been stored in association with the user's account for later access, e.g., by a further request.

Referring back to decision block 106, in cases where the criteria are not met, the method continues to blocks 112 and 114.

When the criteria are not met, block 112 can provide the requested output to the requesting entity. For example, the rendered document, transformed signal samples, or encrypted digital communication can be provided to the requesting entity. In some cases, the default behavior can be to provide the requested output to the requesting entity without also providing the input data to the requesting entity.

Block 114 can delete the input data of the request. For example, the document that was rendered, the signal samples that were transformed, and/or the digital communication that was encrypted can be deleted from storage by the service so that the service and the requesting entity no longer have access to the input data. This may be the case, for example, where the requesting entity generally is not expected to need further access to the input data because they received the expected output.

Cloud Scenario

Figure 2:
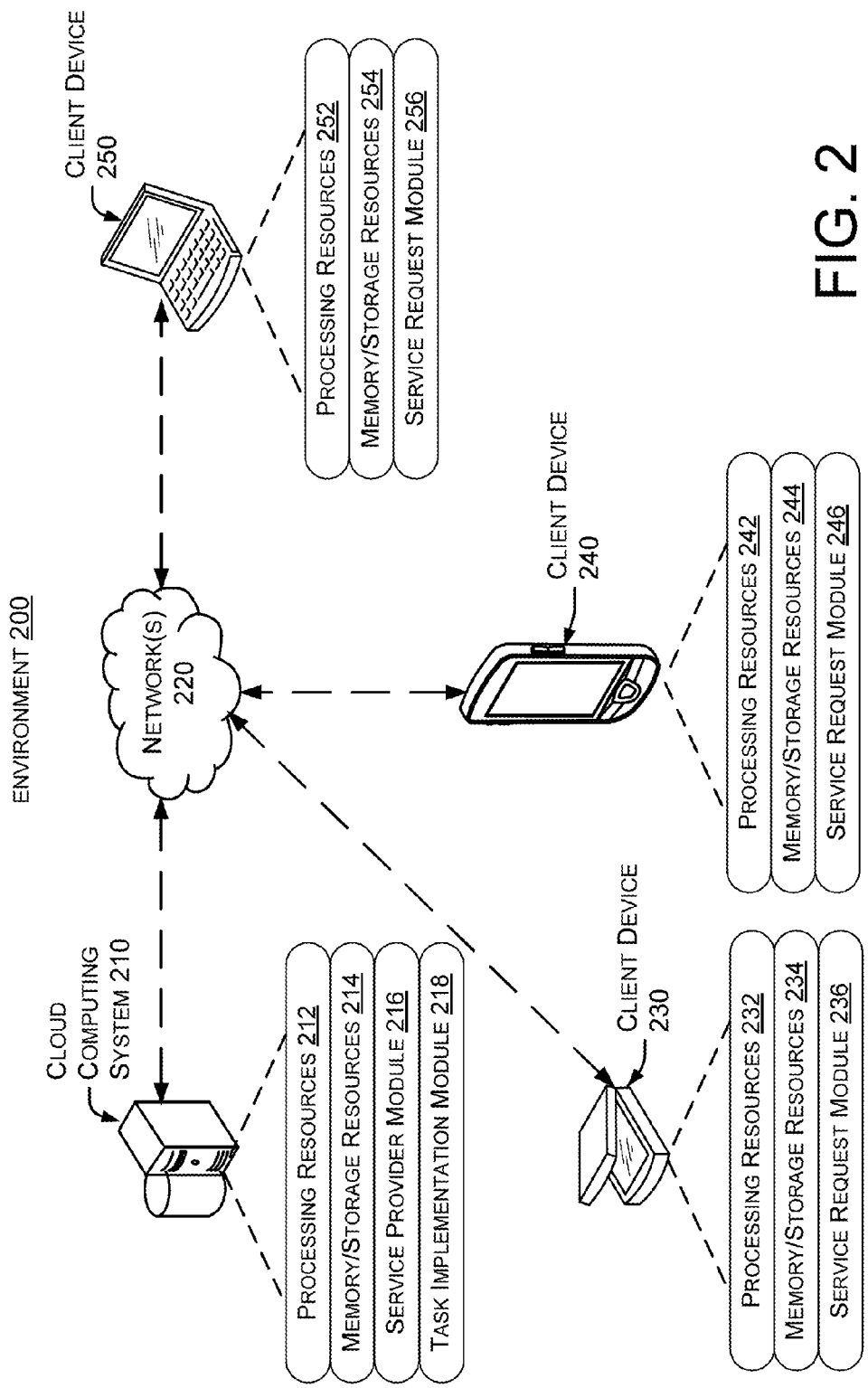
FIG. 2 illustrates an example environment consistent with some implementations of the present concepts.

One specific scenario in which method 100 can be performed is when a cloud service performs the method while interacting with a remote client device. Consider FIG. 2, which shows an example environment 200 including a cloud computing system 210 connected via a network 220 to various client devices shown as a scanner client device 230, a tablet client device 240, and a laptop client device 250, respectively. The cloud computing system and client devices may have respective processing resources 212, 232, 242, and 252 and memory/storage resources 214, 234, 244, and 254 as discussed in more detail below.

Cloud computing system 210 may include a service provider module 216 that provides cloud service functionality such as cloud storage, user accounts, etc. The cloud computing system may also have a task implementation module 218 that performs specific processing tasks requested by the various client devices, such as rendering, encryption, signal processing, document creation/modification, searching, etc. Note that in some cases the task implementation module may be embodied remotely from the cloud computing system 210, e.g., the cloud service acts as a bridge between a third party platform that performs the task and the client devices that request the task. In such cases, the processing task itself may be performed remotely from the cloud computing system on the third party platform.

The client devices 230, 240, and 250 may have corresponding instances of a service request module 236, 246, and 256 that interact with the service provider module 216. For example, the service request modules may be part of a corresponding local instance of a cloud-enabled application executing on the individual client devices that retrieves various data items stored on cloud computing system 210. In some cases, the cloud computing system provides both a user storage portion as well as a cloud service storage portion. In general, the cloud service storage portion of the cloud storage can be used by the cloud service for storage associated with processing by the cloud service, whereas the user storage portion can be used to provide individual users with cloud storage accounts. For example, an individual user may be able to access their cloud storage from any of the client devices by logging into a user account, and the corresponding service request module on the client device may retrieve data such as documents from the user account. In some cases, the client device may specify particular data items to retrieve, and in other cases the client device and cloud service may automatically synchronize local client device data with the user's cloud storage account.

Rendering Examples

As noted above, some implementations may perform many different types of processing tasks for a requesting entity. The following discussion provides some additional specifics of implementations where the service performs a rendering task on behalf of the user. For example, the rendering task may render various document types that are provided as input data, such as portable document format (PDF) files, postscript (PS) files, word processing files (e.g., Microsoft Word®), slide presentation files (e.g., Microsoft PowerPoint®), markup language files (e.g., extendible markup language (XML), hypertext markup language (HTML)), etc. The documents may be rendered from their original document formats into various image formats, such as Joint Photographic Expert Group (JPEG) files, Tagged Image File Format (TIFF) files, bitmaps (BMP), etc.

For example, a given user may upload and maintain various documents and access them from any of their associated client devices. Furthermore, the user may be able to submit requests to the cloud service to render certain documents and then the cloud service may provide the user with access to the output images. In some cases, the cloud service may store the output image files in the user's cloud storage account for later access or may send the image files to the user's client device responsive to the rendering request. For example, as discussed more below, the cloud service may embed the image files in another document that is stored in the cloud storage account.

For clarity of terminology, the term "outer document" refers to a document having another document embedded therein, and the term "embedded document" refers to a document that is embedded in an outer document. The term "embedded image" refers to an image embedded in an outer document." The term "input document" refers to a type of input data, e.g., a document provided to a service for processing.

The immediately following discussion focuses on rendering in a cloud scenario, but note that services may execute locally on a client device as also discussed herein. Assume the cloud computing system 210 receives a request from scanner client device 230 to render an input document to obtain a corresponding image file, and include the rendered image file in an outer document (e.g., an HTML web page) as an embedded image. The cloud service may then provide access to the outer document by sending the outer document with the rendered image file included therein to any of the client devices.

In some cases, the cloud service may, by default, delete the received input document after processing the rendering request. This may be the expected behavior because the user may have no further expectation to use the input document once the rendering has completed. However, consider a case where the rendering request fails, e.g., because the size of the rendered image exceeds some predefined constraint (e.g., the rendered image may be no larger than 50 megabytes). In some implementations, when the failure is detected, the cloud service may preserve the input document instead of deleting the input document. For example, the cloud service may store the input document in the user's cloud storage or send the input document back to the user (e.g., to their laptop, tablet, etc.). Because the input document has been automatically preserved by the cloud service, the input document has not been lost and therefore the user does not need to use the scanner client device 230 to obtain another suitable input document.

In some cases, the cloud service may also embed the input document in the outer document as an embedded document, e.g., as an attached data object that is not necessarily included as an image in the outer document. For example, instead of including the rendered image file in the outer document, the cloud service may include the input document in its original format in the outer document. Thus, while the user may not be able to see the embedded document rendered in the outer document as requested, they may be able to at least use an appropriate application to view the embedded document. In the case of a PDF file, for example, the user may be able to click on a PDF file embedded in the outer document and launch a local instance of a PDF reader application on an individual client device.

Digital Notebook Example

In some implementations, each client device 230, 240, and/or 250 may run an instance of a digital notebook application, such as Microsoft OneNote®, Evernote®, etc. In such implementations, the cloud computing system 210 may provide a digital notebook cloud service that performs various supporting functions for the local instances of the digital notebook application on the client devices. For example, the digital notebook cloud service may provide cloud storage for user notebooks, perform rendering of various file types, and may also support various types of content augmentation (e.g., web clipping as discussed more below). As also discussed more below, a digital notebook is one example of an outer document into which images and/or other document types can be embedded, although many other types of documents can also serve as outer documents (PDF, PS files, word processing files, slide presentation files, markup language files, etc.). For the purposes of the following examples, the digital notebook cloud service may perform functionality that was discussed above with respect to the service provider module 216, and the local instances of the digital notebook client application may perform other functionality that was discussed above with respect to the service request modules 236, 246, and/or 256.

Figure 3:
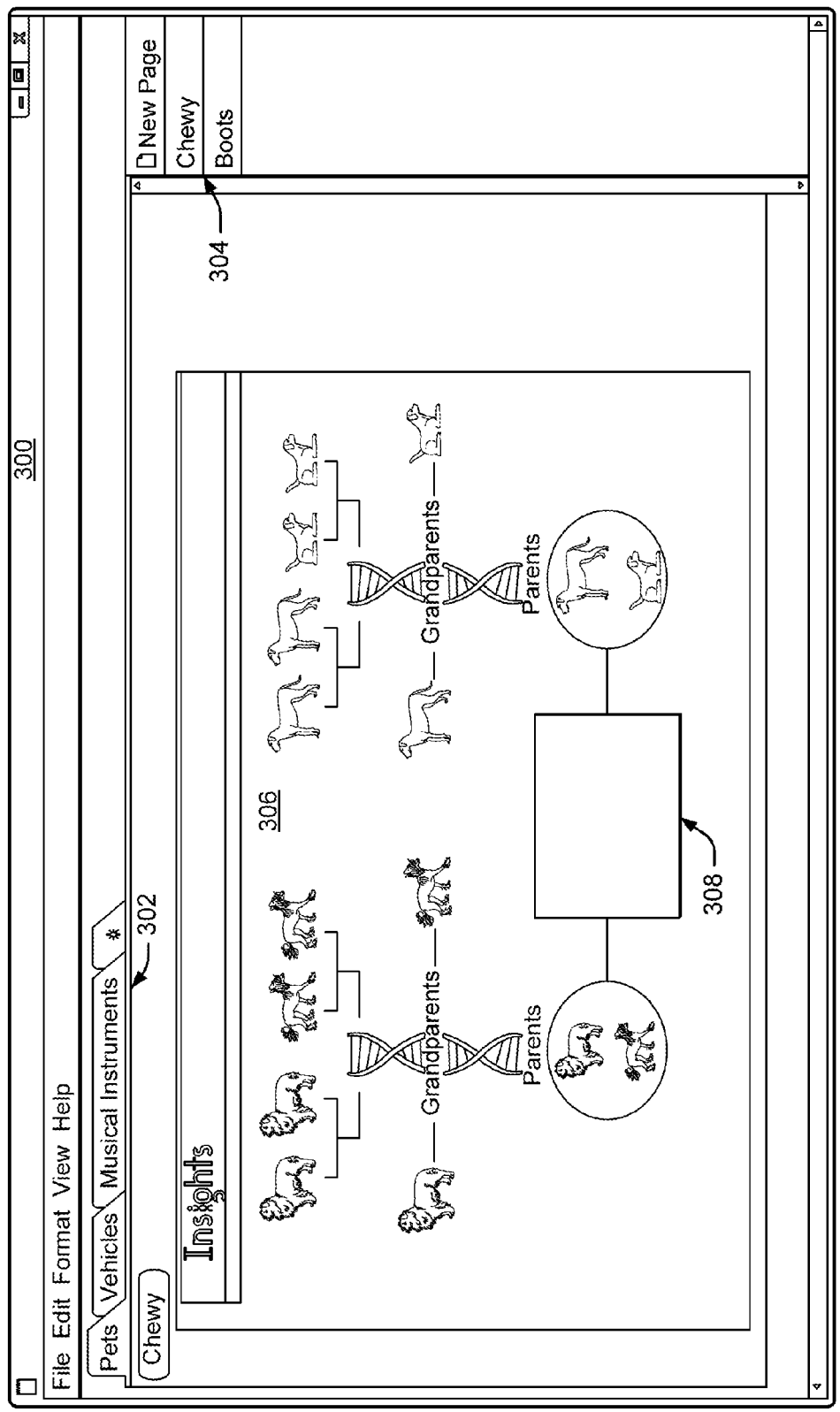
FIGS. 3-12 illustrate exemplary graphical user interfaces consistent with some implementations of the present concepts.

FIG. 3 illustrates an exemplary digital notebook 300 with various tabs 302. In this case, the user has a "Pets" tab open in the notebook and the notebook also includes tabs entitled "Vehicles" and "Musical Instruments." Within the Pets tab are two pages 304, one titled "Chewy" that is presently open and another entitled "Boots." The presently open "Chewy" page has background content 306 generally describing a dog named Chewy's genetic lineage as well as a location 308 where the user wishes to place rendered image content. Assume that the notebook is present in the user's cloud storage in the state shown in FIG. 3 and accessible to the user via any of the client devices.

Next, assume the user scans a picture of their dog Chewy using scanner client device 230. The user may do so because they wish to have the picture of their dog rendered by the cloud service and the image inserted into the digital notebook 300 at location 308. The scanner client device can scan the picture to obtain a PDF file and send the PDF file to the cloud computing system 210. For example, the scanner client device may send a request message that conforms to an API associated with the digital notebook cloud service running on the cloud computing system. The message may specify that the PDF should be rendered and included in the digital notebook 300. Upon receiving the message, the cloud computing system 210 can attempt to render the PDF file into an image format such as a JPEG, BMP, TIFF, or other image file format using task implementation module 218.

Figure 4:
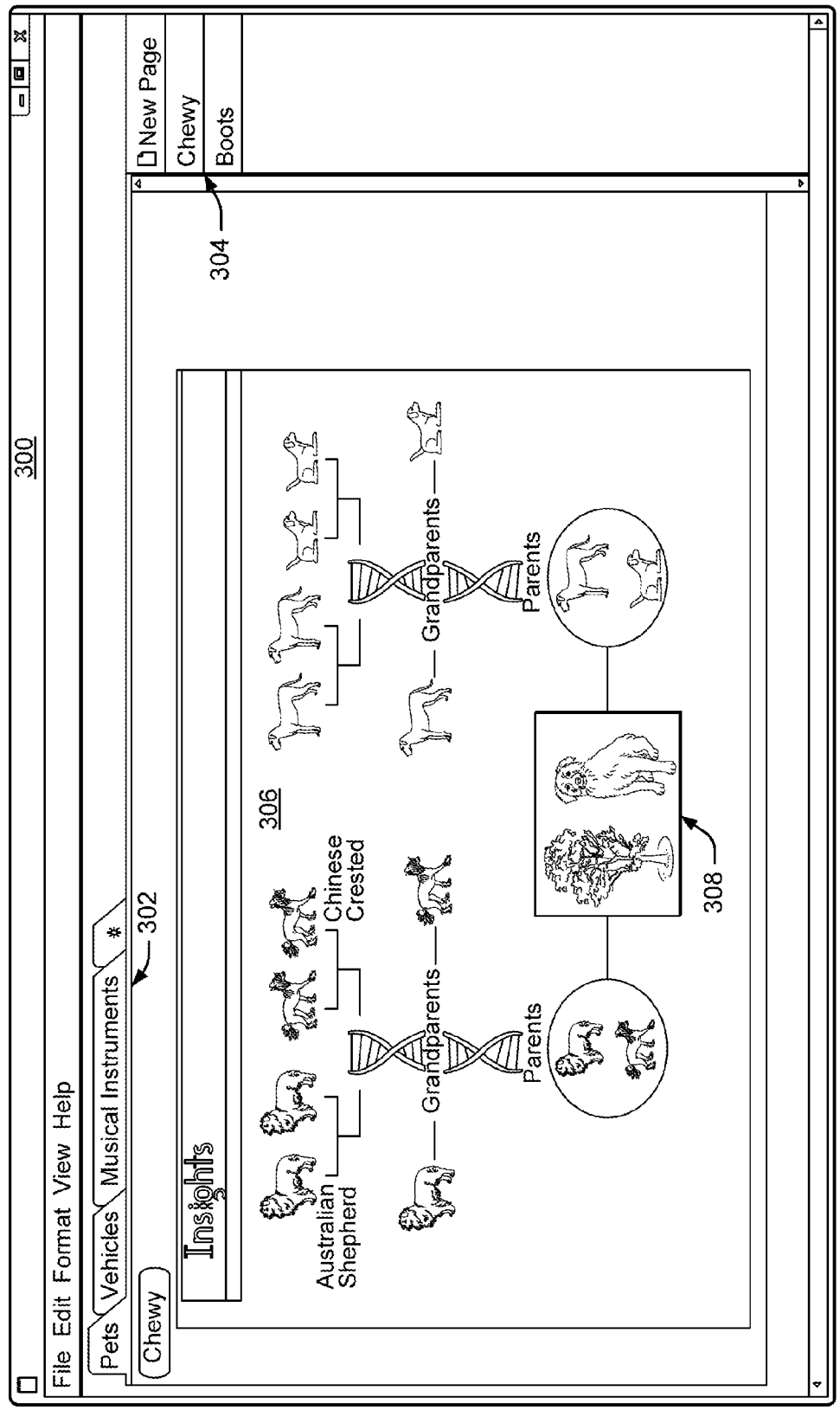

FIG. 4 illustrates digital notebook 300 in a scenario where the render completes successfully and the failure criteria are not met. In this case, the rendered image file is included by the cloud computing system 210 in the digital notebook 300 at location 308, and the notebook is updated in the user's cloud storage. The user can then access the notebook file via any of their client devices. In this case, the PDF file created by the scanner client device 230 may be deleted by the cloud computing system after the rendering completes. This may be consistent with the user's expectations since they are concerned with getting the correct image file into the notebook and may not have any desire to retain the PDF file created by the scanner client device.

Figure 5:
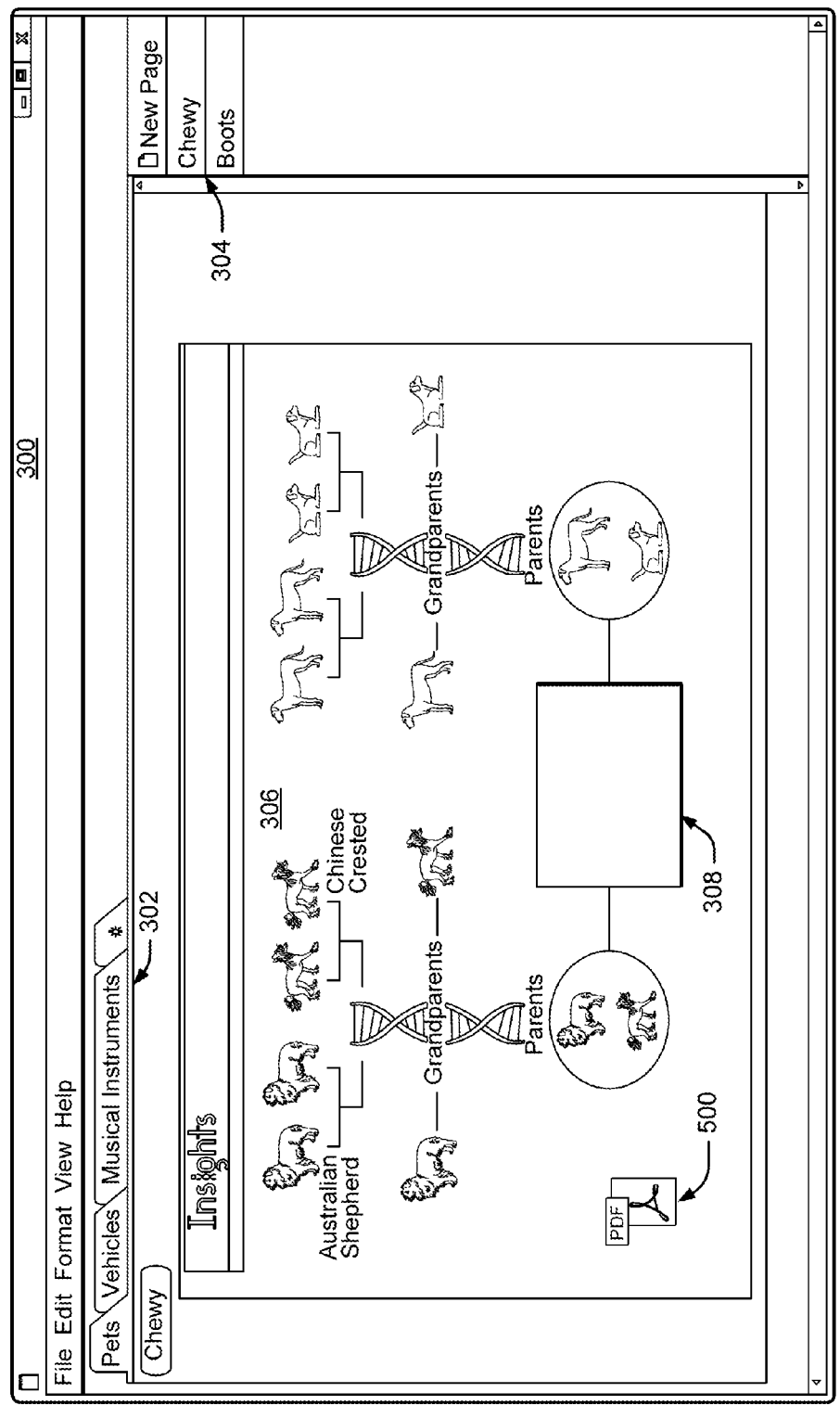

FIG. 5 illustrates digital notebook 300 in a scenario where the render does not complete successfully. Here, either the cloud computing system 210 was unable to successfully render the PDF file or otherwise deemed the request a failed request for one or more of various reasons to be discussed. Note that the scanner client device 230 may not persist any local copy of the PDF after sending the request to the cloud service. Thus, if the cloud service were to simply delete the PDF file as was done when the request was successful, the user would need to re-scan their picture in order to obtain another image of Chewy for the notebook. In this case, however, the cloud service can embed the PDF file as an attachment 500 to the digital notebook 300 as shown in FIG. 5. Thus, even though the user may not have received the expected result (a notebook with a rendered image) from the cloud service, the user can still have access to the PDF file without further efforts to recreate the PDF file. In some cases, the cloud service can send an error message indicating the render failed to one or more of the user's client devices. In addition, the cloud service can update the notebook in the user's cloud storage to include an error message that is displayed in place of the rendered image file. Note that in this example the embedded PDF file is the input data that was received from the user via their scanner client device and is not in the image format that was originally requested by the scanner client device.

Figure 6:
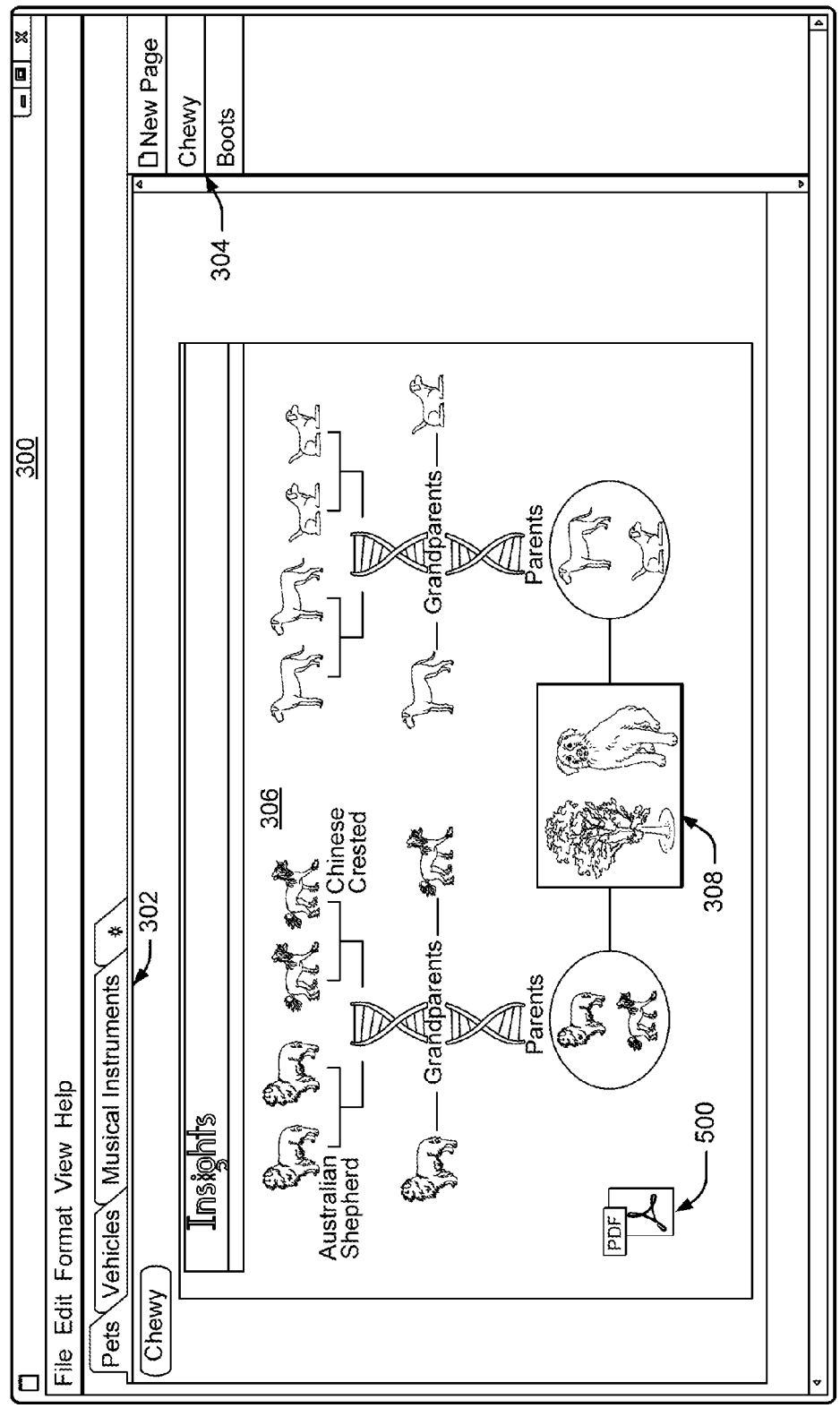

Note that there may be circumstances where the user wishes to have both the rendered image and the PDF file itself included in digital notebook 300. Under these circumstances, the scanner client device 230 can indicate in the request message that the PDF should be both rendered into the digital notebook 300 and also embedded therein in its original file format. In the event the render completes successfully, digital notebook 300 may appear as shown in FIG. 6, with the image successfully rendered and the attachment 500 (PDF file) embedded therein. Alternatively, if the render fails, the notebook may appear as shown in FIG. 5, missing the rendered image but including the embedded PDF file.

Also, note that the digital notebook 300 may be in various file formats. For example, some implementations may use a proprietary file format specific to the notebook application, where the proprietary file format supports other operations such as drawing on the notebook, clipping portions of the notebook, etc. Other implementations may use a more general file format, e.g., by maintaining the notebook as an HTML file.

Drag and Drop Implementations

In the previous example, a first client device (such as a scanner) submitted a request to the cloud service and the document with the embedded image was provided to a second client device (such as a laptop). In other implementations, the same client device can both provide the request to the cloud service and receive the document with the embedded image, as discussed more below.

Figure 7:
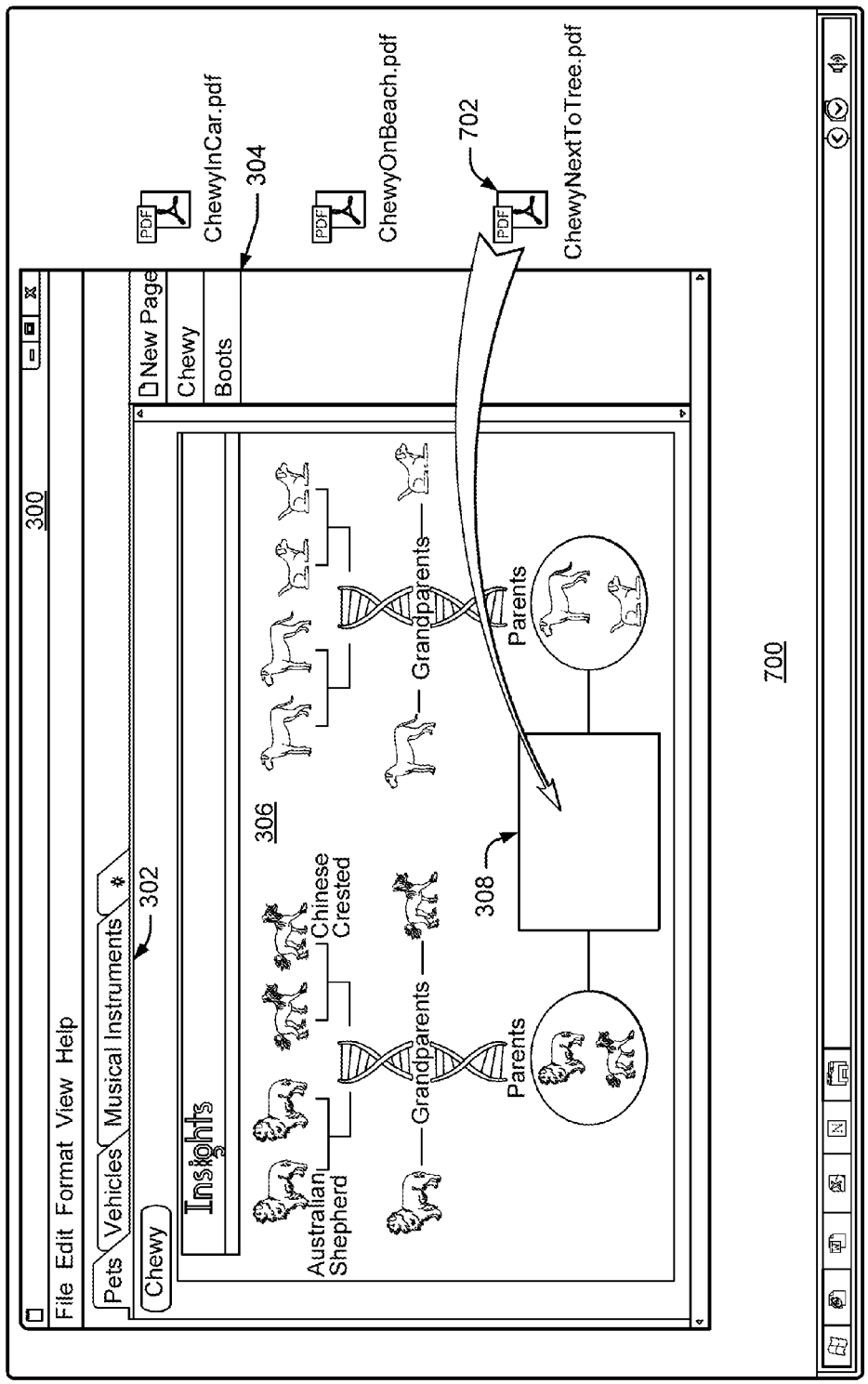

FIG. 7 illustrates an exemplary desktop interface 700 as can be shown on a client device (e.g., laptop client device 250). In this specific example, the desktop interface includes a shortcut 702 to a PDF file stored on the local file system (e.g., hard drive) of the laptop client device. The user may drag the shortcut into digital notebook 300 and onto the location 308. The local notebook application can interpret the drag and drop as an instruction to send a request to the cloud service to render the PDF file as an image and include the image in the digital notebook 300.

Figure 8:
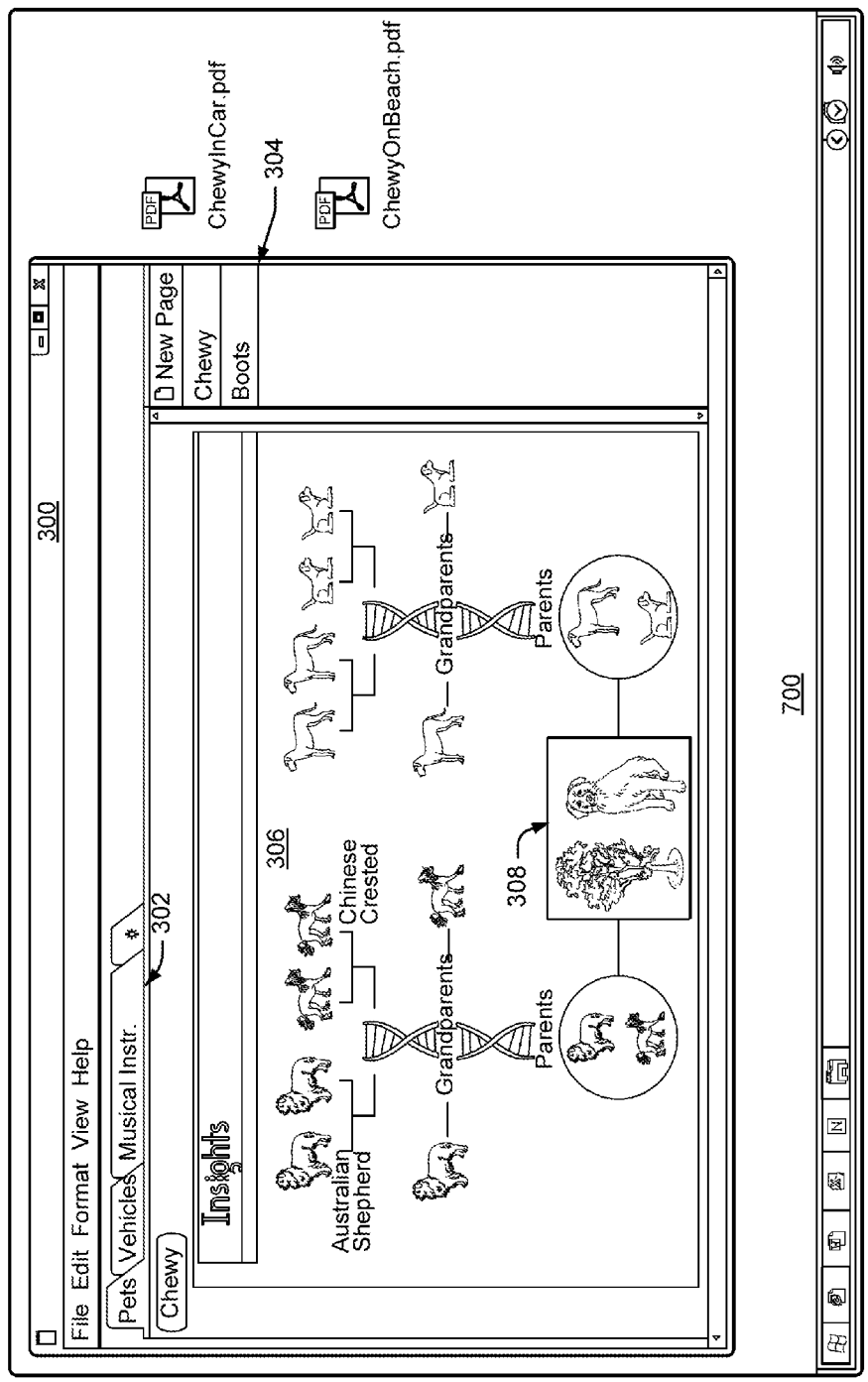

In a case where the render succeeds, the cloud service may update the digital notebook 300 to include the rendered image and send the updated notebook back to the laptop client device. In this case, the desktop interface 700 may appear as shown in FIG. 8, where the image is successfully rendered into the digital notebook 300. The cloud service may have updated the cloud storage with the updated notebook having the rendered image therein, so that the user can access the updated notebook from the other client devices (e.g., tablet client device 240). In this case, note that the PDF file is not embedded in the updated notebook since the user's expectations have been met by the successful render.

Figure 9:
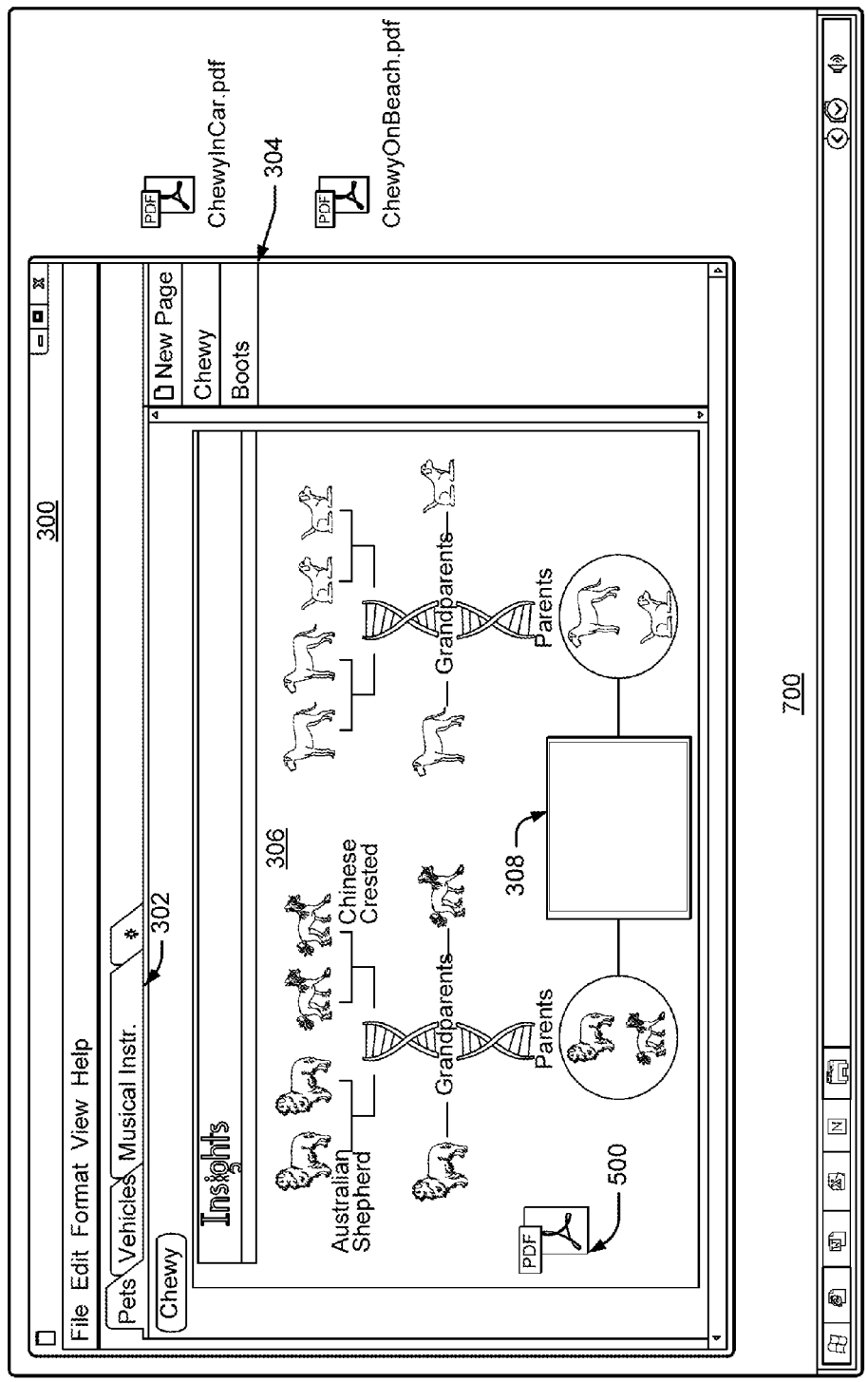

In a case where the render fails, the desktop interface 700 may appear as shown in FIG. 9. Here, the image has not been rendered into the digital notebook 300. However, the cloud service has embedded the PDF file as an attachment 500 into the notebook and updated the notebook in the user's cloud storage account. Thus, when the user accesses the updated notebook from any of their other client devices they can open the PDF file separately using any installed PDF reader applications. In other words, the cloud service has recognized that the rendering failure will result in unmet user expectations and proactively determined that the PDF file should be embedded in the notebook file. In a sense, this can be viewed as a graceful degradation of the user experience that mitigates, to some extent, the impact of the rendering failure.

Web Snipping Example

Figure 11:
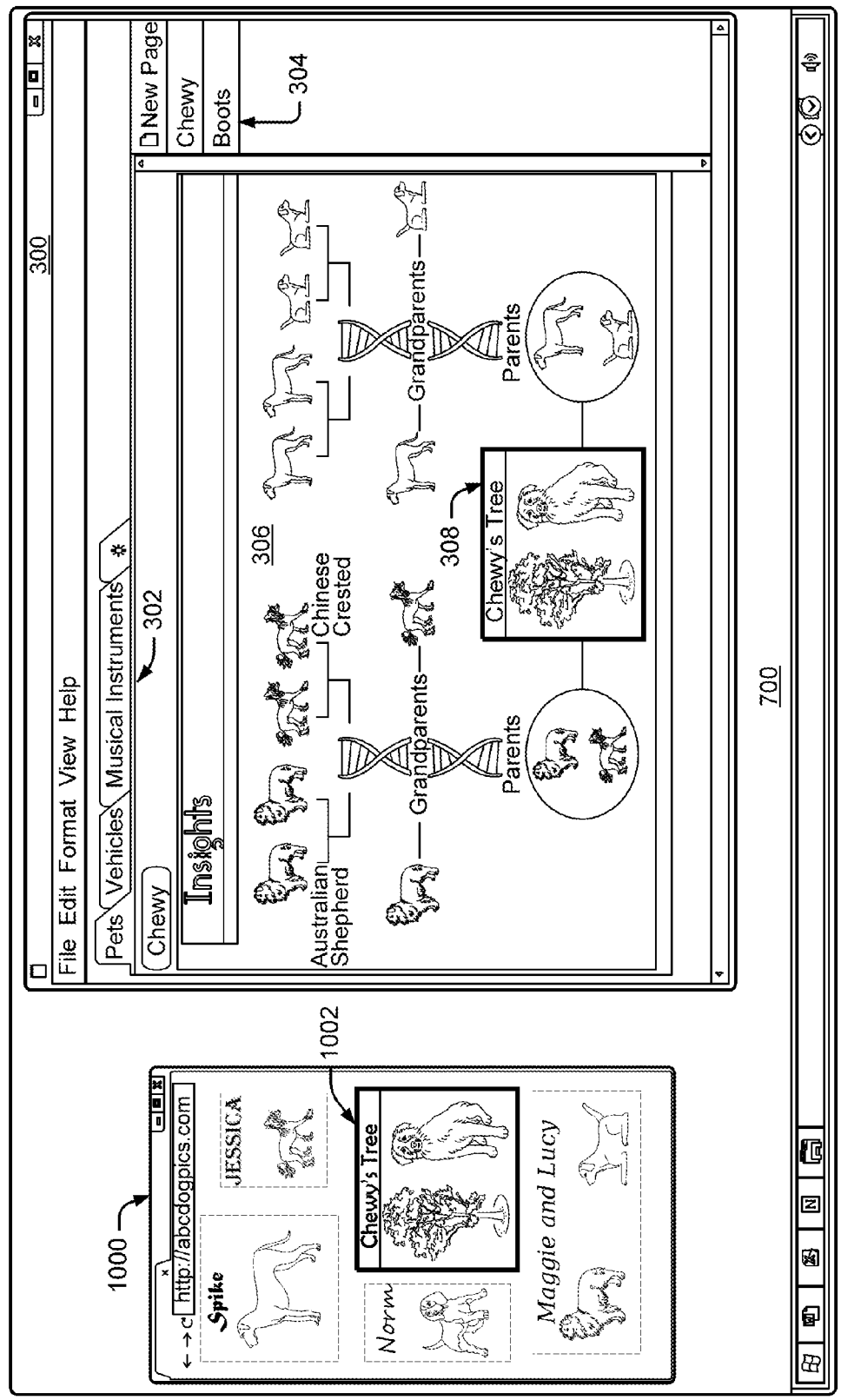
Figure 12:
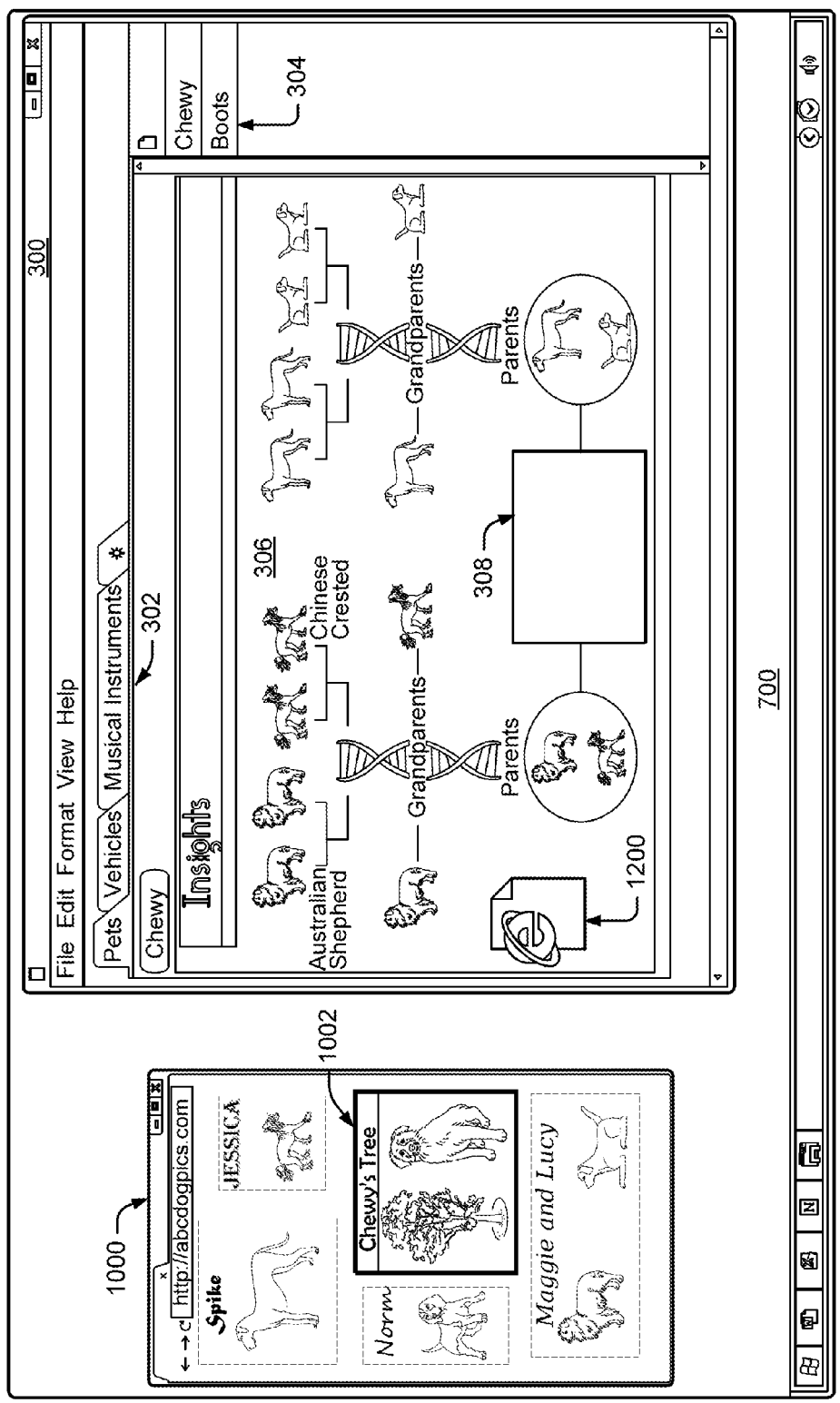

In the previous specific example, a single PDF file was rendered to obtain a single image. However, it is noted that the aforementioned rendering of PDF files is exemplary, and various other file types can be rendered in accordance with the disclosed implementations. For example, FIGS. 10-12 illustrate a scenario where multiple different file types can be rendered responsive to a single request, as discussed below.

Figure 10:
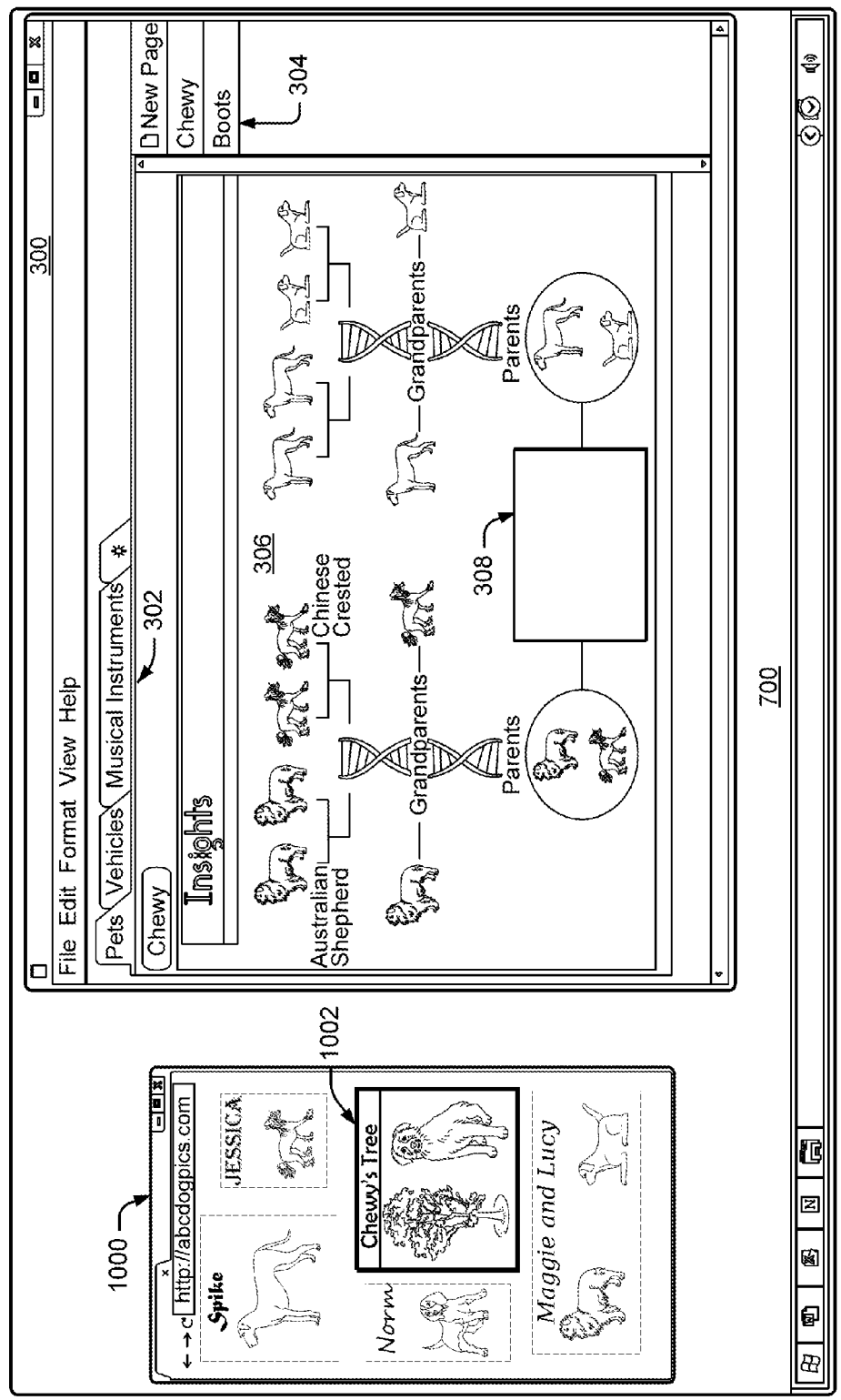

FIG. 10 illustrates desktop interface 700 in a configuration showing a web browser 1000. In this example, the user has navigated to a website called "abcdogpics.com" that may host pictures of the user's dog as well as other dogs. Here, the user may wish to obtain content from the website and include the content into digital notebook 300. The user may use a snipping tool or other content identification tool to select content 1002. Note that the bold border around content 1002 conveys that this is the selected content.

In this example, the content 1002 includes content of two different types—HTML content shown as the text "Chewy's Tree" as well as an image. In this example, assume that the website hosts the image in a BMP format. Thus, the user has snipped content of two distinct file types (HTML and BMP) that they wish to have rendered into one or more images in their notebook.

The selection of content 1002 may be interpreted by a local notebook application as a request to render content 1002 and place the rendered content into digital notebook 300. Responsive to the snipping of the content, the local notebook application may send a request to the cloud service to perform the rendering. In some cases, the local notebook application may extract the selected content from the webpage and send the content to the cloud service. In other cases, the local notebook application may send a uniform resource locator of the webpage to the cloud service along with some identification of the particular content in the webpage that the user wishes to have rendered (e.g., the request may identify one or more HTML attributes of the selected content).

In the event the cloud service successfully renders the HTML and BMP content identified by the user, the digital notebook 300 may appear as shown in FIG. 11. Here, the snipped content has been successfully rendered into the digital notebook 300, perhaps as one or more JPG files. In this case, the cloud service has not persisted the webpage or included the webpage in the notebook.

FIG. 12 illustrates a scenario where the render did not complete properly at the cloud service. In this case, no JPG images appear in location 308. However, note that HTML file 1200 has been embedded into digital notebook 300. Thus, even though the user does not have the rendered JPG image in their notebook file as expected, they do at least have the hosted content embedded in the notebook for later use. This can be useful in various circumstances, e.g., if the domain http://abcdogpics.com becomes unavailable, the user is not connected to a network, etc. Note that the embedded content can, in some cases, include the entire hosted web page (including the embedded BMP file) or, alternatively, only the part of the web page selected by the user (e.g., the BMP file and the portion of the HTML content corresponding to the text "Chewy's Tree").

Local Implementations

The aforementioned techniques can also be performed locally on an individual computing device. Generally, a given computing device may have both a service and a requesting application that uses the service for certain processing. For example, the service can be an operating system routine, encryption or compression functionality performed by other applications and/or dedicated hardware, mathematical routines performed by a mathematics or statistical package, etc.

Continuing with the digital notebook and rendering examples set forth above, consider a scenario in which tablet client device 240 and/or laptop client device 250 have a local rendering service capable of rendering files. The client devices may still use the cloud service for storage of the files, e.g., notebooks with embedded images rendered by the client devices. However, instead of the cloud service performing the rendering, the local rendering service does so.

Now, consider the scanner scenario introduced above where the scanner client device 230 sent the PDF file to the cloud service for rendering. Alternatively, the scanner client device may send the PDF file to the tablet client device 240 and/or laptop client device 250 for rendering thereon. The local notebook application may evaluate the input PDF, computational resources used by the local rendering service, and/or characteristics of the output image in a manner similar to those discussed above for the cloud implementations.

Other Processing Types

In the aforementioned rendering examples, documents of various file formats were rendered into images in different file formats by either a cloud service or a local service. More generally, services can perform a wide range of processing tasks for a given requesting entity such as a user, application, or device. The following discusses some different types of services that can implement the aforementioned techniques.

Note that a given rendered image can be viewed as a representation of the input file(s), and the processing task can be viewed as a transformation of the input data from one electronic format (e.g., a PDF file) into another electronic format (e.g., a JPG file). Certain services may perform other types of processing tasks that also transform input data into a different representation of the input data. For example, if the input data is time-domain samples of a waveform, the service can transform the time-domain samples into a frequency-domain representation using a transform operation such as a Fast Fourier Transform (FFT). As another example, an encryption service can transform unencrypted input data into an encrypted representation of the input data.

Another example of a service that transforms input data into a different representation of the input data is a service that transforms a document into another document. For example, a document transformation service can transform a word processing document in a first word processing format (e.g., Microsoft Word®) into a second word processing format (e.g., OpenOffice®) or into a different document type (e.g., a spreadsheet, markup language document, ASCII text, etc.). The document transformation service may preserve the input document in the first format when failure criteria such as those discussed herein are identified, e.g., the document transformation service cannot complete the transformation properly, the input or output document is too large, the processing takes too long or uses excessive computational resources, etc.

Other services may produce outputs that may not be considered representations of the input data. For example, the input data may be a search query having various search terms, and the output may be a list of documents matching the search query. As another example, the input data may be a mathematical value and the processing task may perform various operations on the mathematical value and other mathematical values, e.g., adding the input data to a constant.

One specific example of a search query could be a scenario where a user enters an International Standard Book Number (ISBN) into a local application such as the aforementioned notebook application. The local application may provide the ISBN to a cloud service, which may in turn attempt to provide the user with a digital copy of part or all of the book itself, e.g., a PDF copy of the book. In some cases, no PDF of the book may be available. Under these circumstances, the cloud service may alternatively respond to the user by providing the user with a URL to a shopping webpage for the book. In further implementations, the cloud service may render the shopping service webpage for the book into another document such as a notebook. In either case, the cloud service may also include the ISBN of the book in the document so that the user does not need to look up the ISBN again at a later time.

In other implementations, the local application may perform the processing described above. For example, responsive to the user entering the ISBN, the local application may attempt to download a digital copy of the book. In the event the digital copy of the book is not available, the local application may instead access the shopping webpage URL for the book and persist the webpage on the client device. In cases where the local application creates/modifies documents, the local application may request that the webpage be rendered by a local or remote rendering service, and insert the rendered webpage into the document. In the event the rendering fails, the local application may embed the webpage into the document as an object as previously discussed, and/or may embed the ISBN in the document so that the user does not need to retrieve the ISBN again.

Request Types

In some implementations, the request provided to the service may include various fields specifying how the request should be processed. In some cases, requests may explicitly indicate whether the input data should be provided in the output produced by the service. As discussed above, the service may override the request when certain failure criteria are satisfied.

For example, in the specific examples discussed above, the scanner client device 230 may send a request to the cloud computing system 210 specifying how the PDF file should be included in the notebook. Some requests may include one or more parameters indicating whether the PDF should be rendered in the digital notebook 300 as shown in FIG. 4, embedded in the notebook as shown in FIG. 5, or both embedded and rendered as shown in FIG. 6. As another example, a request to transform a time domain signal to a frequency domain representation may indicate whether the input signal samples should be included in the output with the frequency domain representation of the signal.

The techniques disclosed herein may be performed in circumstances where the request indicates that the service should not include the input data in the output of the processing task. Under these circumstances, the service can be viewed as effectively overriding the request parameters when the service includes the input data in the output. While this may be contrary to the parameters expressed in the request, the outcome may be acceptable because the request parameters are based on the assumption that the service request will complete successfully. By overriding the request parameters in response to detecting certain failure criteria, the input data can be preserved for subsequent use instead of losing this data. For example, in the rendering examples set forth above, the PDF, HTML, and/or BMP files that were input with the rendering requests were preserved in the notebook. In the signal transform example mentioned above, the input signal samples can be persisted in some way that they remain accessible for the requesting entity when the transform fails for some reason, e.g., by storing the samples in a specified location when the transform does not complete. The signal transform service may do so even when the requesting entity requests that the samples be discarded.

Note that in some cases the requesting entity may, by default, delete input data after making a request. In the cloud rendering examples set forth above, the cloud computing system 210 may acknowledge the request from the scanner client device 230 before it is apparent whether the rendering will complete successfully, or indeed before the rendering is even initiated. The receipt of this acknowledgement from the cloud device may prompt the scanner client device to delete its local copy of the PDF file under the assumption that the cloud service will successfully render out the PDF file. In some cases, the scanner client device does not ever become aware of a failed render. Likewise, in the signal transform examples set forth above, the service may by default delete input samples instead of storing them in the specified location where they are stored when the transform fails.

Some requests may also specify how to arrange the output data. For example, in the rendering examples, the request may specify a particular location where the output image should be included in the digital notebook 300. In addition, the request may specify where to include the rendered image, e.g., at a particular location in an existing tab or page, by creating a new tab or page, in a new notebook, etc. As another example, the service may be a compression service that reduces the size of an input image. The request may specify where to include the compressed version of the image in an output web page.

As also noted above, the request can be in the form of code, e.g., a markup language format such as HTML. In some cases, the code of the request can be used to construct the output. For example, in the rendering examples above, the request can be an HTML representation of a web page that refers to a specific PDF file, e.g.:

```
<!DOCTYPE html>
<html>
   <head>
      <title>A page with a displayed PDF file</title>
   </head>
   <body>
      <object
         data-attachment="ChewyNextToTreePDF"
         data="name:MyAppFileBlockName "
         type="application/pdf" />
      <img data-render-src="name:MyAppFileBlockName"
width="1024"/>
   </body>
</html>
--MyAppPartBoundary
Content-Disposition:form-data;
name="MyAppFileBlockName"
Content-type:application/pdf
... embedded PDF file binary data ...
--MyAppPartBoundary—
```

The example request above includes a parameter that requests the service perform a rendering operation, e.g., "img data-render-src." This parameter refers to "myAppFileBlockName" which is an indirect reference to a file name of a PDF that is included in the request, which is entitled "ChewyNextToTreePDF." The line specifying "data-attachment" is an explicit request for the service to embed the PDF file in a page of a notebook. The absence of this line may indicate that the PDF file should not be embedded in the notebook page. As noted above, in cases where the rendering operation fails the service may override requests that omit this line and embed the PDF file in the notebook page.

Failure Criteria

As noted above, the service may determine that some failure criteria have been met before initiating the associated processing task. Other failure criteria may become evident during processing by the service and may not even be apparent until after processing has completed. As a consequence, in some cases it may be possible to immediately determine that a service request will fail, and in other cases some processing will be performed or even completed before the service will recognize that the failure criteria are met.

In some situations, failure criteria can be identified before beginning the processing task. For example, early identification of failures can be performed in cases where the failure can be detected by evaluating the input data. For example, in the rendering implementations discussed above, some file types (e.g., MIME types) may not be supported for rendering purposes. Thus, if the input data is not in a supported MIME type (e.g., no available renderer) then the failure criteria may be satisfied. As another example, one failure criteria may be that the binary size of the input data may not exceed a predetermined threshold (e.g., 15 megabytes). As another example, malformed inputs (e.g., having a missing HTML tag) can also be considered a failure criteria. In the case where the service performs a mathematical operation, the failure criteria may specify certain data types (e.g., no unsigned integers) that are not accepted by the service, and may also specify upper and/or lower limits on the output (e.g., limits of a 32 bit signed integer).

Another type of failure criteria that can be identified before beginning the processing task is failed authentications. For example, suppose a digital certificate, user name and password, or other authentication mechanism is used to authenticate input data. If the authentication mechanism fails, the input data can be preserved as discussed herein without initiating the processing task.

In other situations, failures may be detected while processing is ongoing. For example, failure criteria related to resource utilization may be useful for identifying failures during processing. In some cases, the failure criteria can specify a limit on certain computer resources used for the processing, e.g., the amount of memory used to process a given request, a limit on the amount of processor time/cycles, a limit on the amount of data transferred across a network, etc. If processing of a given request exceeds such a limit, then the request can fail prior to completing. For example, in some cases, the processing task can be killed when the criteria are met. In some cases, such resource utilization criteria vary as load on the service changes, and in other cases can be static.

Another example of detecting a failure during processing occurs when a file being processed includes references to remote files and the references cannot be resolved or accessed. For example, a network failure could prevent the remote files from being accessed, or the references may identify LAN storage addresses on the user's local network that are not accessible to the service as a result of certain LAN permissions. These remote files could be files that the user wishes to render into a notebook, files that the user wishes to encrypt, files that the user wishes to compress, etc.

In some cases, failures may not be apparent until processing completes and produces an output. Thus, some failure criteria relate to characteristics of the output and the service may evaluate the output to determine whether these criteria are met. For example, the overall size of the output data may be one failure criteria, e.g., the total size of a rendered image, transformed signal, compressed file, etc., may not exceed a fixed size (e.g., 75 megabytes). In some cases, the output may have multiple components (e.g., pages of a notebook file, worksheets in a spreadsheet file, etc.) and the size of each component may have a specified limit (e.g., memory footprint no more than 5 megabytes). Other implementations may specify a limit on the number of components, e.g., no more than 30 pages rendered, no more than 10 worksheets in the spreadsheet, etc.

In some cases, the output itself may not, in isolation, cause a failure. However, the output may be part of a set of data that have certain associated criteria and adding the output to that set may cause the set of data to trigger the criteria. In other words, the output itself does not meet the criteria for failure but when aggregated with other items in the set then the failure occurs. For example, the user may have a storage quota (expressed in bytes, megabytes, gigabytes, etc.) on cloud storage and the failure criteria may be met when storing the output in the user's cloud storage would cause the user's total file storage to exceed their storage quota. As another example, there may be a fixed limit on the total number of documents the user may store in cloud storage irrespective of the individual file sizes, e.g., 100 documents, and the output may be the $101^{st}$ document.

Note that there may also be cases where storing the input data in the users' cloud storage will cause them to exceed their storage quota. Some implementations may override the storage quota in the event of a failure at least temporarily to prevent data loss and provide a relatively soft failure from the user's perspective. Other implementations may delete the input data under these circumstances.

Other failure criteria may relate to circumstances where the processing actually crashes or reports some sort of error. For example, the processing task may report that the input data is malformed and the rendering has been halted. As another example, the processing task itself may have certain constraints (e.g., a virtual memory limit) that are violated when processing the input data.

Furthermore, note that users may still be able to access partial results in some failure cases. For example, assume the service imposes a limit of 30 pages on rendered documents, and the rendering task successfully completes and outputs a 50 page rendered image. Thus, even though the service could provide the entire rendered 50 page document to the user, for policy reasons only 30 pages are provided to the user. Under these circumstances, the service may take steps to preserve the input data, such as by updating the notebook in the user's cloud storage to include 30 out of 50 rendered pages as well as the PDF document itself. Similar steps can also be performed by the service in circumstances where the user does not receive all 50 rendered pages because the rendering task crashes after rendering only some of the pages.

As another example, consider a service that converts a database file into a spreadsheet. For example, assume the service imposes a limit of 10 worksheets on output spreadsheet, and the spreadsheet creation task successfully completes and outputs a spreadsheet with 15 worksheets. Thus, even though the service could provide the entire 15-sheet spreadsheet to the user, for policy reasons a partial spreadsheet with only 10 worksheets is provided to the user. Under these circumstances, the service may take steps to preserve the input data, such as embedding the database file in the partial spreadsheet and storing the partial spreadsheet in the user's cloud storage. Similar steps can also be performed by the service in circumstances where the user does not receive all 15 worksheets because the spreadsheet creation task crashes after only some of the worksheets are created.

Note also that, in some cases, the characteristics of the output may be not be apparent when processing begins. For example, in the case of PDF rendering, it may not be possible or efficient to analyze the PDF to determine how large the rendered PDF will be, how many pages it will contain, how large the individual pages will be, etc. As another example, it may not be possible or efficient to evaluate the database file to determine how many different worksheets will be created in an output spreadsheet. Under these circumstances, it may be useful or necessary to allow the processing task to complete so that the output can be evaluated.

Further Examples

The various examples discussed herein can include a first method example performed by at least one computing device. The first method example can include obtaining a request that a service perform processing on input data to produce an output representation of the input data, applying criteria to the request, and, responsive to determining that the criteria are met, preserving the input data. In a second method example, the input data of the first method example can include a document for the service to render to obtain the output representation. In a third method example, applying the criteria to the request in the first or second method examples can include evaluating the input data. In a fourth method example, applying the criteria to the request in the first, second, or third method examples can include evaluating computer resources used to perform the service. In a fifth method example, applying the criteria to the request in the first, second, third or fourth method examples can include evaluating the output representation of the input data. In a sixth method example, the request of any of the first through fifth method examples is on behalf of a user having associated cloud storage, and the preserving the input data includes storing the input data in the associated cloud storage of the user. In some further method examples, some or all of the first through sixth method examples are performed by a cloud service executing remotely from a requesting entity (e.g., an application), and alternatively by a local service executing on the computing device with the requesting entity.

The various examples discussed herein can also include a first example cloud computing system that includes one or more hardware processing units and one or more computer-readable storage devices storing computer-executable instructions which, when executed by the one or more hardware processing units, cause the first example cloud computing system to receive a service request that includes input data over a network, determine that the service request indicates that the input data should not be persisted by the first example cloud computing system, and responsive to detecting a failure, override the service request by persisting the input data. In a second example cloud computing system example, the computer-executable instructions of the first example cloud computing system example cause the cloud computing system to persist the input data by storing the input data in cloud storage. In a third example cloud computing system example, the computer-executable instructions of the first or second cloud computing system examples cause the cloud computing system to persist the input data by embedding the input data as an object in a document. In a fourth cloud computing system example, the cloud computing system of the first through third cloud computing system examples provides a digital notebook cloud service and the input data is embedded in a digital notebook. In a fifth cloud computing system example, the service request of the first through fourth cloud computing system examples is a request to render the input data. In a sixth cloud computing system example, the input data of the first through fifth cloud computing system examples includes a portable document format file. In a seventh cloud computing system example, the computer-executable instructions of the first through sixth cloud computing system examples cause the cloud computing system to detect the failure by applying criteria to at least one of the input data, an output of the service request, or computer resources used to process the service request. In other examples, client devices locally perform the processing that is discussed above with respect to the first through seventh cloud computing systems.

The various examples discussed herein can include an additional first method example performed by at least one computing device. The additional first method example can include obtaining a service request having input data, applying criteria to the service request by evaluating an output of the service request, and, responsive to detecting that the output of the service request satisfies the criteria, preserving the input data of the service request. In a second additional method example, the first additional method example is performed by a local service executing on the at least one computing device on behalf of an application that is also executing on the at least one computing device. In a third additional method example, the applying the criteria in the first or second additional method examples includes determining whether an overall memory footprint of the output exceeds a threshold. In a fourth additional method example, the applying the criteria of the first through third additional method examples includes determining whether any components of the output have memory footprints exceeding a threshold. In a fifth additional method example, the applying the criteria of the first through fourth additional method examples includes determining whether storing the output causes a storage quota to be exceeded. In a sixth additional method example, a storage quota of the first through fifth additional method examples includes a cloud storage quota associated with a user account. In a seventh additional method example, the preserving the input data of the first through sixth additional method examples includes storing the input data in cloud storage associated with the user account.

Device Implementations

Referring back to FIG. 2, environment 200 as shown includes several devices. In this case, for purposes of explanation, the devices are characterized as client devices and a cloud computing system. In this example, the client devices are manifest as a scanner, tablet, and laptop device. However, other types of devices can serve as client devices, such as smart phones, desktop computers, printers, or computing-enabled home appliances. Generally, so long as a device has some computational hardware, the device can act as a client device in accordance with the disclosed implementations.

Cloud computing system 210 can include one or more cloud-based server type devices, although in some cases the cloud computing system may include any of the aforementioned client device types. The cloud computing system can communicate with a datastore that may be co-located with the cloud computing system. Of course not all device implementations can be illustrated and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more processors (e.g., hardware processing units/cores) that can execute data in the form of computer-readable instructions to provide functionality. Computer-readable instructions and/or data can be stored on storage, such as storage/memory and or the datastore.

The storage/memory can be internal or external to the device. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose processor and storage/memory. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (GPUs), controllers, microcontrollers, processor cores, or other types of processing devices suitable for implementation both in conventional computing architectures as well as SOC designs.

In some configurations, the service request module, the service provider module, and/or the task implementation module can be installed as hardware, firmware, or software during manufacture of the device or by an intermediary that prepares the device for sale to the end user. In other instances, the end user may install the service request module, service provider module, and/or task implementation module later, such as by downloading executable code and installing the executable code on the corresponding device.

Also note that devices generally can have input and/or output functionality. For example, computing devices can have various input mechanisms such as keyboards, mice, touchpads, voice recognition, etc. Devices can also have various output mechanisms such as printers, monitors, etc.

Also note that the devices described herein can function in a stand-alone or cooperative manner to implement the described techniques. For example, method 100 can be performed on a single computing device and/or distributed across multiple computing devices that communicate over network(s) 220. Without limitation, network(s) 220 can include one or more local area networks (LANs), wide area networks (WANs), the Internet, and the like.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed by at least one computing device, the method comprising:
    obtaining, by at least one server, a request that a service perform processing on input data to produce an output representation of the input data;
    preprocessing the request to determine whether a failure of the request is likely to occur based on criteria, wherein the criteria comprises at least one of a time-out, a malformed input, an unacceptable data type, or an authentication failure; and
    responsive to determining that a failure of the request is likely to occur, preserving the input data.

2. The method of claim 1, wherein the input data comprises a document for the service to render to obtain the output representation.

3. The method of claim 1, wherein applying the criteria to the request comprises evaluating the input data.

4. The method of claim 1, wherein applying the criteria to the request comprises evaluating computer resources used to perform the service.

5. The method of claim 1, wherein determining that a failure of the request is likely to occur is performed prior to producing the output representation of the input data.

6. The method of claim 1, wherein the request is on behalf of a user having associated cloud storage, and the preserving the input data comprises storing the input data in the associated cloud storage of the user.

7. A cloud computing system comprising:
    one or more hardware processing units; and
    one or more computer-readable storage devices storing computer-executable instructions which, when executed by the one or more hardware processing units, cause the cloud computing system to:
        receive a service request over a network, the service request comprising input data;
        determine that the service request indicates that the input data should not be persisted by the cloud computing system;
        preprocess the service request to determine whether a failure of the service request is likely to occur based on criteria, wherein the criteria comprises at least one of a time-out, a malformed input, an unacceptable data type, or an authentication failure; and
        responsive to determining that a failure of the service request is likely to occur, override the service request by persisting the input data.

8. The cloud computing system of claim 7, wherein the computer-executable instructions cause the cloud computing system to:
    persist the input data by storing the input data in cloud storage.

9. The cloud computing system of claim 7, wherein the computer-executable instructions cause the cloud computing system to:
    persist the input data by embedding the input data as an object in a document.

10. The cloud computing system of claim 9, wherein the cloud computing system provides a digital notebook cloud service and the object is embedded in a digital notebook.

11. The cloud computing system of claim 10, wherein the service request is a request to render the input data.

12. The cloud computing system of claim 11, wherein the input data comprises a portable document format file.

13. The cloud computing system of claim 7, wherein the computer-executable instructions cause the cloud computing system to:
determine that the failure of the service request is likely to occur by applying the criteria to at least one of the input data or computer resources for processing the service request.

14. A method performed by at least one computing device, the method comprising:
obtaining a service request having input data;
preprocessing the service request to determine whether a failure of the service request is likely to occur based on criteria, wherein the criteria comprises at least one of a time-out, a malformed input, an unacceptable data type, or an authentication failure; and
responsive to determining that a failure of the request is likely to occur based on the criteria, preserving the input data of the service request.

15. The method of claim 14, performed by a local service executing on the at least one computing device on behalf of an application that is also executing on the at least one computing device.

16. The method of claim 14, wherein applying the criteria comprises determining whether an overall memory footprint of the output will exceed a threshold.

17. The method of claim 14, wherein applying the criteria comprises determining whether any components of the output will have memory footprints exceeding a threshold.

18. The method of claim 14, wherein applying the criteria comprises determining whether storing the output will cause a storage quota to be exceeded.

19. The method of claim 18, wherein the storage quota comprises a cloud storage quota associated with a user account.

20. The method of claim 19, wherein the preserving the input data comprises storing the input data in cloud storage associated with the user account.

* * * * *